United States Patent [19]
Hattori et al.

[11] Patent Number: 4,877,667
[45] Date of Patent: Oct. 31, 1989

[54] OPTICAL DISC WITH INHIBITED THERMAL DISTORTION

[75] Inventors: Michinobu Hattori; Hidemitsu Fujisawa; Akio Kusaura, all of Amagaski, Japan

[73] Assignee: Mitsubishi Denki Kabushiki Kaisha, Tokyo, Japan

[21] Appl. No.: 168,125
[22] PCT Filed: May 28, 1987
[86] PCT No.: PCT/JP87/00343
  § 371 Date: Mar. 4, 1988
  § 102(e) Date: Mar. 4, 1988
[87] PCT Pub. No.: WO88/00755
  PCT Pub. Date: Jan. 28, 1988

[30] Foreign Application Priority Data
  Jul. 22, 1986 [JP] Japan ............................. 61-113992
  Jul. 22, 1986 [JP] Japan ............................. 61-113993
  Jul. 22, 1986 [JP] Japan ............................. 61-113994
  Jul. 22, 1986 [JP] Japan ............................. 61-113995

[51] Int. Cl.$^4$ .............................................. B32B 3/02
[52] U.S. Cl. ........................................ 428/64; 428/65; 428/212; 428/412; 428/900; 428/913; 430/945; 369/280; 369/282; 369/289; 369/290; 346/76 L; 346/135.1
[58] Field of Search ............... 428/64, 65, 913, 323, 428/331, 412, 212, 900; 430/945; 369/280, 282, 289, 290; 346/76 L, 135.1

[56] References Cited

U.S. PATENT DOCUMENTS

| | | | |
|---|---|---|---|
| 1,875,086 | 8/1932 | McMann | 369/290 |
| 3,416,154 | 12/1968 | Heller et al. | 396/135.1 |
| 4,616,278 | 10/1986 | Yamaguchi et al. | 369/282 |
| 4,634,617 | 1/1987 | Ohta et al. | 428/65 |
| 4,658,393 | 4/1987 | Ohta et al. | 369/290 |
| 4,698,715 | 10/1987 | Oishi | 360/133 |

FOREIGN PATENT DOCUMENTS

| | | |
|---|---|---|
| 562944 | 10/1932 | Fed. Rep. of Germany . |
| 120243 | 7/1982 | Japan . |
| 172543 | 10/1982 | Japan . |
| 203645 | 11/1983 | Japan . |
| 20373 | 2/1985 | Japan . |
| 133567 | 7/1985 | Japan . |

Primary Examiner—Ellis P. Robinson
Assistant Examiner—P. J. Ryan
Attorney, Agent, or Firm—Sughrue, Mion, Zinn, Macpeak and Seas

[57] ABSTRACT

An optical disc in which distortion due to temperature change is inhibited has a magnetic positioning disc 3 of specified diameter mounted at the center of the disc substrate 1 having an information recording layer 2 on a specified radial area. The positioning disc is bonded to the disc substrate by an element(s) made of a material whose thermal expansion coefficient is almost equivalent to that of the disc substrate.

3 Claims, 2 Drawing Sheets

FIG. 1
PRIOR ART
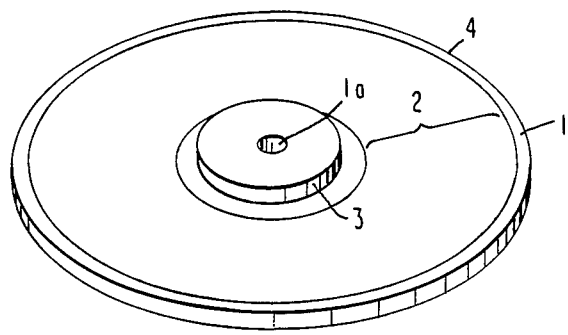
FIG. 2
PRIOR ART
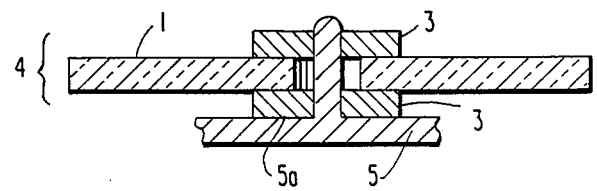
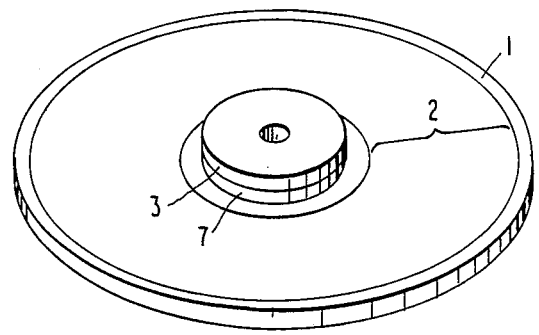
FIG. 3(a)
FIG. 3(b)
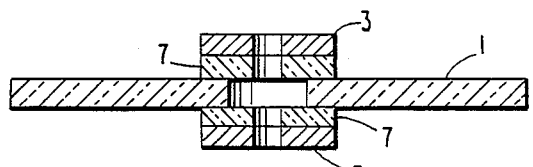

OPTICAL DISC WITH INHIBITED THERMAL DISTORTION

BACKGROUND OF THE INVENTION

The present invention relates to an optical disc.

FIG. 1 is a perspective view of an optical disc 4 according to the prior art. In the drawing, reference numeral 1 denotes a disc-shaped substrate which is formed of polycarbonate or the like and has a centering hole 1a (whose diameter is 15 mm, for example) in the center. 2 denotes an information recording layer which is formed concentrically at a specified radial area on the disc substrate 1 and which is used for recording and reproducing information by an input-output device, not shown. 3 denotes a disc of magnetic material whose outer diameter is smaller than the inner diameter of the information recording layer. The optical disc 4 is formed by bonding one disc 3 to the upper face of the disc substrate 1 with an adhesive, and further by bonding another disc 3 to the lower face thereof so that the substrate is sandwiched between a pair of discs 3.

FIG. 2 is a sectional view of the optical disc 4 mounted on an optical disc driver, in which the disks 3 are attracted by a magnet 5a mounted on a disc turntable 5. The optical disc 4 is rotated by turning the disc turntable 5. Under such condition, information is written in the information recording layer 2 or read out therefrom by irradiating the layer with a laser beam.

According to the aforementioned prior optical disc, there is a difference between the thermal expansion coeffcient ($7 \times 10^{-5}$ mm/°C.) of the disc substrate 1 and that ($1 \times 10^{-5}$ mm/°C.) of the discs 3 of magnetic material, and therefore a problem exists in that distortion occurs in the disc substrate 1 whose thermal expansion coefficient is larger due to temperature change in the internal section of the optical driver. The distortion increases variations in the birefringence of the laser beam in the disc substrate irradiated when reading out information, thereby increasing noise when reproducing the information.

SUMMARY OF INVENTION

The present invention was made to solve the above-discussed problem, and has an object of providing an optical disk whose distortion due to temperature change is inhibited.

The optical disc according to the invention comprises a disc substrate having an information recording layer in a specified radial area thereof and a disc of a specified diameter mounted at the center of the disc substrate. A bonding section of the disc to the disc substrate is formed of a material whose thermal expansion coefficient is almost equivalent to the thermal expansion coefficient of the disc substrate.

Since the bonding section of the disc to the disc substrate is of a material having a thermal expansion coefficient almost equivalent to that of the disc substrate according to the invention, the disc substrate is prevented from being affected by the thermal expansion of any portion of the disc other than the bonding section. As a result, distortion in the optical disc due to temperature change can be inhibited.

BRIEF DESCRIPTION OF DRAWINGS

FIG. 1 is a perspective view showing an optical disc according to the prior art;

FIG. 2 is a sectional view of the optical disc according to the prior art;

FIGS. 3(a) and 3(b) show an optical disc according to an embodiment of the present invention, wherein FIG. 3(a) is a perspective view and FIG. 3(b) is a sectional view;

FIGS. 4(a) and 4(b) show an optical disc according to another embodiment of the invention, wherein FIG. 4(a) is a perspective view and FIG. 4(b) is a sectional view;

DETAILED DESCRIPTION OF THE PREFERRED EMBODIMENTS

Figure 4A:
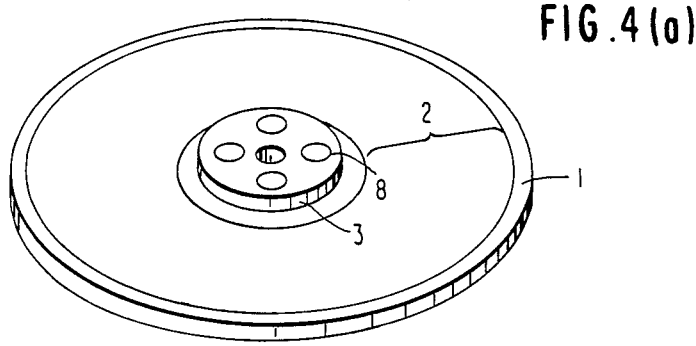

FIGS. 3(a) and 3(b) show an optical disc according to an embodiment of the invention, wherein reference numerals 1, 2 and 3 denote the same parts as the foregoing prior art. Reference numeral 7 denotes a disc which is interposed between the disc substrate 1 and the disc 3. The disc 7 is formed of a material (such as polycarbonate) whose thermal expansion coefficient is almost equivalent to that of the disc substrate, and both inner and outer diameters of the disc 7 are so arranged as to be almost the same as those of the disc 3. The the disc substrate 1, the disc 7 and the disc 3 are bonded in order by a specified adhesive.

In the optical disc of this embodiment, the disc 7 whose thermal expansion coefficient is almost equivalent to that of the disc substrate 1 is interposed between the disc substrate 1 and the disc 3 with their respective thermal expansion coefficients different from each other. Accordingly, when thermal expansion or shrinkage takes place in any section of the optical disc due to temperature change, a distortion indeed occurs in the disc 3, but occurrence of distortion in the disc substrate 1 is reduced by the disc 7.

Figure 4B:
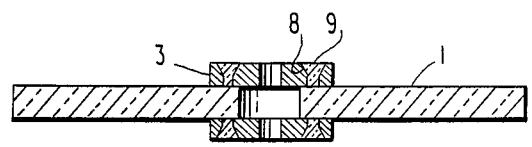

FIGS. 4(a) and 4(b) show an optical disc according to another embodiment of the invention, wherein reference numeral 8 denotes a plurality of holes which are formed on the disc 3 and located on the circumference of a concentric circle having a specified diameter. Ends of apertures of the holes are respectively countersunk. 9 denotes fixing members or anchoring studs by which the disc substrate 1 is coupled with the disc 3. Each fixing member 9 is made of a material almost the same as the disc substrate 1 such as polycarbonate, and has a diameter allowing insertion into a hole 8. The head of the fixing member 9 is designed to fit the countersink of the hole 8. The fixing member 9 is designed longer by a certain length than the thickness of the disc 3, forming a welding section of specified configuration on a surface facing the disc substrate 1, and connects the disc substrate 1 and the disc 3 by ultrasonic welding.

According to the optical disc of the above-described composition, when the disc substrate 1 and the disc 3 are expanded due to thermal expansion, the difference in thermal expansion coefficient between the disc substrate 1 and the disc 3 are reduced, since the thermal expansion coefficient of the fixing member 9 coupled is almost equivalent to that of the disc substrate 1.

In addition, the head of the fixing member 9 is designed according to the configuration of the hole in the foregoing embodiment, but it is also satisfiable that both ends of a bar-like fixing member with its diameter almost the same as the hole are welded by heat caulking means to perform the same function as the foregoing embodiment.

Figure 5:
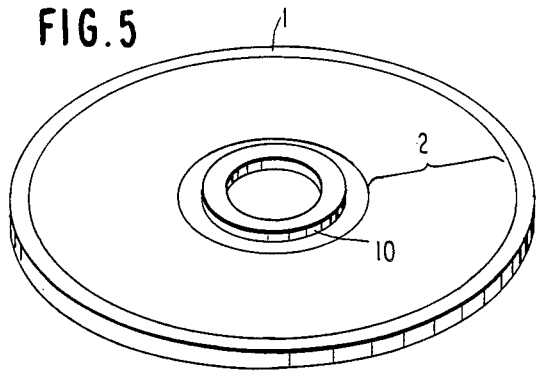
FIG. 5 is a perspective view showing an optical disc according to a further embodiment of the invention.

FIG. 5 is a perspective view showing an optical disc according to a further embodiment of the invention, numeral 10 denotes a disc of soft magnetic material having a specified outer diameter, which is smaller than the inner diameter of the information recording layer 2, and a specified inner diameter. The disc 10 is made by molding a material whose principal component is Fe-Al-Si (whose thermal expansion coefficient is $6.7 \times 10^{-5}$ mm/°C. or so), for example, and has a certain value of magnetic intensity. In such optical disc, the difference in their respective thermal expansion coefficients is small, and therefore distortion in the disc substrate is reduced when expanded thermally.

In addition, the soft magnetic material forming the disc is not limited to the Fe-Al-Si, but such material as Mn-Zn-Si, Ni-Zn-Si is also satisfiable to perform the same function as the foregoing embodiment.

Figure 6:
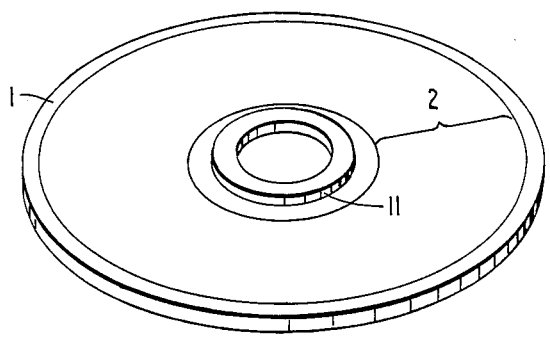
FIG. 6 is a perspective view showing an optical disc according to a yet another embodiment of the invention.

FIG. 6 is a perspective view showing an optical disc according to another embodiment of the invention. Reference numeral 11 denotes a disc having specified inner and outer diameters which is formed by molding a material mixed with a magnetic material substantially the same as the disc substrate 1. The disc 11 is bonded to the disc substrate with a specified adhesive. When the disc substrate 1 is of a material such as polycarbonate, the disc 11 is formed by filling up a polycarbonate material with a certain amount of magnetic powder, mixing it so that the magnetic powder is distributed as specified, and molding the mixture of molding means.

In the disc of such arrangement, the difference between the disc substrate 1 and the disc 11 in their thermal expansion coefficients is small when thermally expanded, and the occurence of distortion in the disc substrate 1 is considerably reduced.

In this connection, the amount of magnetic powder to be added to the disc 11 is set at least to an amount of the magnetic material attracted by and fastened to the optical disc by the action of a magnet of the optical disc driver.

INDUSTRIAL APPLICABILITY

The present inventon is applicable to an optical disc for use in a memory of a computer to inhibit the optical disc from distortion.

We claim:

1. An optical disc assembly, comprising:
(a) a centrally apertured, planar disc substrate (1) made of a plastic material, such as polycarbonate, having a high coefficient of thermal expansion,
(b) an annular optical information recording/reproducing layer (2) formed on the substrate concentrically surrounding the central aperture thereof and having an inner periphery spaced radially outwardly therefrom,
(c) a pair of turntable mounting and centering discs (3) individually coaxially disposed on opposite sides of the substrate, said discs having axially aligned central spindle apertures of smaller diameter than the substrate aperture and being made of a magnetic material having a coefficient of thermal expansion lower than that of the substrate, and
(d) means for fixedly mounting the so disposed discs to the substrate, said mounting means having a coefficient of thermal expansion substantially the same as that of the substrate such that thermal expansions and contractions of the substrate are borne by the mounting means to attendantly avoid any planar distortion or buckling of the substrate,
(e) wherein said mounting means is selected from the group comprising:
(1) a pair of intermediate discs (7) configured substantially identical to the mounting and centering discs, made of the same plastic material as the substrate, individually coaxially disposed between the respective mounting and centering discs and the substrate, and adhesively bonded thereto, and
(2) a plurality of headed anchoring studs (9) individually extending through an equal plurality of axially parallel apertures (8) spaced around the spindle aperture of each disc and extending therethrough, said anchoring studs having inner ends ultrasonically welded to the substrate.

2. An optical disc assembly, comprising:
(a) a centrally apertured, planar disc substrate (1) made of a plastic material, such as polycarbonate,
(b) an annular optical information recording/reproducing layer (2) formed on the substrate concentrically surrounding the central aperture thereof and having an inner periphery spaced radially outwardly therefrom,
(c) a pair of turntable mounting and centering discs (10) individually coaxially affixed to opposite sides of the substrate, said discs having axially aligned central spindle apertures of smaller diameter than the substrate aperture and being made of a soft magnetic material selected from the group comprising Fe-Al-Si, Ni-Zn-Si and Mn-Zn-Si, such magnetic material having a coefficient of thermal expansion substantially the same as that of the substrate such that planar distortion or buckling of the substrate due to thermal expansions and contractions is avoided.

3. An optical disc assembly, comprising:
(a) a centrally apertured, planar disc substrate (1) made of a plastic material, such as polycarbonate,
(b) an annular optical information recording/reproducing layer (2) formed on the substrate concentrically surrounding the central aperture thereof and having an inner periphery spaced radially outwardly therefrom,
(c) a pair of turntable mounting and centering discs (11) individually coaxially affixed to opposite sides of the substrate, said discs having axially aligned central spindle apertures of smaller diameter than the substrate aperture and being molded from a mixture of a plastic material corresponding to that of the substrate and a magnetic powder such that the discs have a coefficient of thermal expansion substantially the same as that of the substrate to attendantly avoid any planar distortion or buckling of the substrate due to thermal expansions and contractions.

* * * * *